(No Model.)
A. S. HILL.
CLAMP.
No. 563,591.        Patented July 7, 1896.
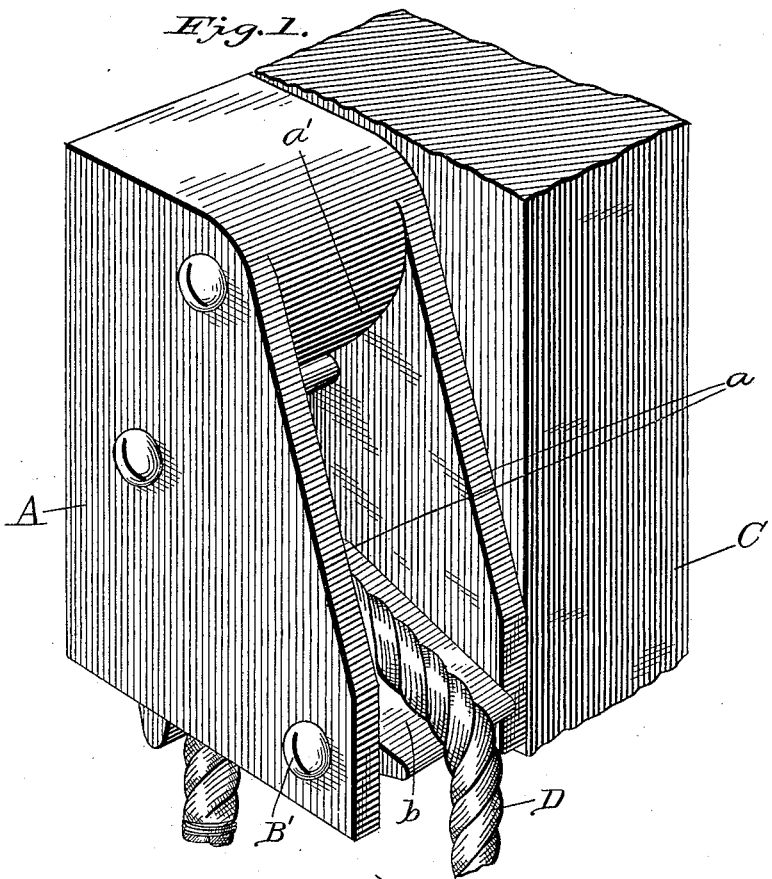
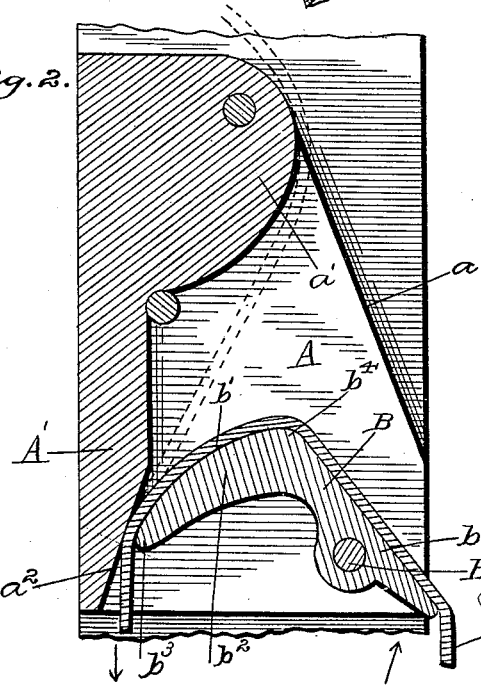
Witnesses
Edwin G. McKee
K. A. Nau
Inventor
Alexander S. Hill,
By John Wedderburn,
Attorney

UNITED STATES PATENT OFFICE.

ALEXANDER S. HILL, OF PIERRE, SOUTH DAKOTA.

CLAMP.

SPECIFICATION forming part of Letters Patent No. 563,591, dated July 7, 1896.

Application filed November 25, 1895. Serial No. 570,090. (No model.)

*To all whom it may concern:*

Be it known that I, ALEXANDER S. HILL, a citizen of the United States, residing at Pierre, in the county of Hughes and State of South Dakota, have invented certain new and useful Improvements in Clamps; and I do hereby declare the following to be a full, clear, and exact description of the invention, such as will enable others skilled in the art to which it appertains to make and use the same.

This invention relates to certain new and useful improvements in devices for holding straps, ropes, and lines, by which horses and other animals or any object may be hitched or fastened or confined. It pertains to hitching devices of that class in which a swinging dog is employed for engaging the strap or rope and so constructed that the greater the strain on the strap or rope the more firmly it will be held by reason of the engagement therewith of the dog.

The present invention has for its objects, primarily, to provide a simple and cheap, yet efficient and durable hitching device of this class so constructed that the line or strap will not be injured and all liability of cutting of the strap or line by repeated use is avoided. I avoid sharp angles at the points where the strap is to be engaged. The dog is so mounted that the insertion of the strap between the same and the coöperating part of the device automatically throws the dog into its operative position.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a perspective view of my improved hitching device applied to a support therefor. Fig. 2 is a substantially central longitudinal section through the device.

Like letters of reference indicate like parts throughout both the views.

Referring now to the details of the drawings by letter, A designates the block or casting, comprising the substantially parallel side pieces $a$, forming a chamber or cavity within which the dog is arranged. At one end there is formed between the side portions $a$ a rounded protuberance $a'$, while the lower or opposite face of what I term the "bottom" $A'$ of the device is formed with an inclined wall $a^2$, as indicated in Fig. 2.

B is the dog, pivotally mounted on a suitable pivot $B'$, supported in the side portions $a$ of the block or casting at a point opposite the inclined wall $a^2$. It will be observed on reference to Fig. 2 that this pivot is so disposed with relation to the end of the side walls and to the tail of the dog that the said tail projects a sufficient distance to permit of its being turned beyond a horizontal line with said pivot, as seen in Fig. 2, so as to provide additional leverage and render the device practically automatic in its binding action by the drawing of the strap over the inclined wall $b$ of the dog. The long arm $b^2$ of the dog has a rounded acting face $b'$, as seen in Fig. 2, and its extreme point $b^3$ is also preferably rounded, so as to avoid a sharp angle at this point. The dog, as well as the block in which it is mounted, may be formed of any suitable material and mounted at any desired position. In Fig. 1 it is shown as mounted upon a post or support C, but this is done simply to illustrate one manner of supporting it.

In practice the strap or rope D is passed over the face $b$ of the dog and over the rounded face of the long arm $b^2$ thereof down between the same and the inclined wall $a^2$ of the block, and immediately that strain is placed upon the strap or rope it will force the dog downward and its point $b^3$ will bite on the strap and hold it firmly against the inclined wall $a^2$ of the block or casting. The greater the strain on the strap or rope the more securely it will be bound, owing to the peculiar construction of the dog, which, as it will be observed from Fig. 2, provides a long bearing for the strap, and the strap bearing upon the tail of the dog great leverage is obtained and but little power required to bind the strap or rope firmly. It may be released by simply pressing upon the tail of the dog in the direction of the arrow in Fig. 2 or by pulling upon the other end of the strap in the direction of the arrow there indicated. It will be observed that the point $b^4$ of the dog is rounded, so that when the strap or rope is bound around the same there is no sharp angle to mar or cut the same.

It will be understood that the strap or rope can be securely held by passing it through between the rounded point $b^3$ of the dog and the inclined wall of the block or casting and bringing it up over the rounded protuberance $a'$, instead of over the dog in the position indicated in Fig. 2. Such a disposition of the strap is indicated by dotted lines in Fig. 2.

What I claim as new is—

1. A hitching device comprising a block having a chamber with a rounded protuberance at one end and an inclined wall at the other end, and a dog pivotally mounted in said chamber opposite the inclined wall and formed with a tail upon one side of its pivot and with an acting portion upon the other side of the pivot at substantially a right angle to the tail, with its extreme point rounded and adapted to act in conjunction with said inclined wall to automatically bind a strap or rope therebetween, substantially as and for the purposes specified.

2. The hitching device described, comprising a block having a chamber with a rounded protuberance at one end and an inclined wall at the other end and a dog pivotally mounted in said chamber opposite the inclined wall and having an acting portion with a rounded outer face and rounded end disposed in proximity to said inclined wall and a tail upon the opposite side of its pivot, the outer face of the main portion being inclined and at its junction with the curved acting portion, formed upon a curve, substantially as shown and described.

In testimony whereof I have signed this specification in the presence of two subscribing witnesses.

ALEXANDER S. HILL.

Witnesses:
 E. S. HUNGERFORD,
 M. F. CARPENTER.